United States Patent
Indurthi et al.

(10) Patent No.: US 9,646,250 B1
(45) Date of Patent: May 9, 2017

(54) COMPUTER-IMPLEMENTED COGNITIVE SYSTEM FOR ASSESSING SUBJECTIVE QUESTION-ANSWERS

(71) Applicant: International Business Machines Corporation, Armonk, NY (US)

(72) Inventors: Sathish R. Indurthi, Bangalore (IN); Mitesh M. Khapra, Bangalore (IN); Yedendra B. Shrinivasan, Yorktown Heights, NY (US); Mitesh H. Vasa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/943,427

(22) Filed: Nov. 17, 2015

(51) Int. Cl.
  *G06N 5/04* (2006.01)
  *G06F 17/30* (2006.01)
(52) U.S. Cl.
  CPC .......... *G06N 5/04* (2013.01); *G06F 17/3043* (2013.01)
(58) Field of Classification Search
  None
  See application file for complete search history.

(56) References Cited

U.S. PATENT DOCUMENTS

| 5,180,309 | A | 1/1993 | Egnor | |
|---|---|---|---|---|
| 2008/0126319 | A1 | 5/2008 | Bukai et al. | |
| 2009/0287678 | A1* | 11/2009 | Brown | G06F 17/30654 |
| 2011/0066587 | A1* | 3/2011 | Ferrucci | G06N 5/04 |
| | | | | 706/54 |
| 2011/0125734 | A1* | 5/2011 | Duboue | G09B 7/00 |
| | | | | 707/723 |
| 2012/0041950 | A1* | 2/2012 | Koll | G09B 7/02 |
| | | | | 707/728 |
| 2012/0077178 | A1* | 3/2012 | Bagchi | G09B 7/00 |
| | | | | 434/362 |
| 2012/0078891 | A1* | 3/2012 | Brown | G06F 17/30654 |
| | | | | 707/723 |

(Continued)

OTHER PUBLICATIONS

Prager, John M. "Open-Domain Question-Answering." Foundations and trends in information retrieval 1.2 (2006): 91-231.*

(Continued)

*Primary Examiner* — Kakali Chaki
*Assistant Examiner* — Daniel Pellett
(74) *Attorney, Agent, or Firm* — Scully, Scott, Murphy & Presser, P.C.; Louis J. Percello, Esq.

(57) ABSTRACT

A cognitive system that automatically assesses subjective answers may be provided. A cognitive engine executing on one or more processors may determine whether a statement parsed from a subjective answer by natural language processing technique is accurate or inaccurate, for each of the plurality of statements based on matching the statement with information associated with a domain of a question from a plurality of data sources, according to an accuracy threshold. An overall assessment of the answer may be automatically determined based on a number of statements determined to be accurate, a number of statements determined to be inaccurate, a number of duplicate statements in the answer relative to a total number of statements in the answer. A visual graphics representing accurate and inaccurate statements may be presented or displayed, allowing a user to interact with the visual graphics to modify the assessment.

19 Claims, 3 Drawing Sheets

(56) References Cited

U.S. PATENT DOCUMENTS

2012/0301864 A1  11/2012 Bagchi et al.
2013/0007055 A1* 1/2013 Brown .............. G06F 17/30654
                                                    707/769
2014/0297571 A1  10/2014 Beamon et al.
2015/0058329 A1   2/2015 Cook et al.

OTHER PUBLICATIONS

Park, Seonyeong, et al. "Question Answering System using Multiple Information Source and Open Type Answer Merge." Proceedings of NAACL-HLT. 2015.*
Lin, Jimmy, et al. "What makes a good answer? The role of context in question answering." Proceedings of the Ninth IFIP TC13 International Conference on Human-Computer Interaction (INTERACT 2003). 2003.*
Tellex, Stefanie, et al. "Quantitative evaluation of passage retrieval algorithms for question answering." Proceedings of the 26th annual international ACM SIGIR conference on Research and development in informaion retrieval. ACM, 2003.*
Qazvinian, V., et al., "Rumor has it: Identifying Misinformation in Microblogs", Proceedings of the 2011 Conference on Empirical Methods in Natural Language Processing, Jul. 27-31, 2011, pp. 1589-1599, Edinburgh, Scotland, UK.
Kulkarni, C., et al., "Scaling Short-answer Grading by Combining Peer Assessment with Algorithmic Scoring", ACM, Mar. 4-5, 2014, 10 pages, Atlanta, GA.
Yu, H., "Towards Answering Opinion Questions: Separating Facts from Opinions and Identifying the Polarity of Opinion Sentences", EMNLP '03 Proceedings of the 2003 conference on Empirical methods in natural language processing, Jul. 11-12, 2003, pp. 129-136.

* cited by examiner

COMPUTER-IMPLEMENTED COGNITIVE SYSTEM FOR ASSESSING SUBJECTIVE QUESTION-ANSWERS

FIELD

The present application relates generally to computers and computer applications, and more particularly to a computer-implemented cognitive system that assesses subjective question-answers.

BACKGROUND

Assessment of subjective content usually takes manual processing. For example, assessing examination answer sheets with subjective answers is mostly done manually while assessing objective answers has been automated. Even when automated, assessing subjective answers require a reference gold standard or solution set for accurate assessment. The present disclosure in one aspect describes a computer-implemented system and method that assesses answers without an input solution set.

BRIEF SUMMARY

A computer-implemented cognitive system and method may be provided. The system, in one aspect, may include one or more hardware processors. A cognitive engine may be operable to execute on one or more of the hardware processors and further operable to receive first data representative of a domain associated with a question. The cognitive engine may be further operable to search a database of sources and retrieve information associated with the domain. The cognitive engine may be further operable to receive second data representative of an answer to the question, the second data comprising a plurality of statements. The cognitive engine may be further operable to determine whether a statement is accurate or inaccurate, for each of the plurality of statements based on matching the statement with the information associated with the domain according to an accuracy threshold. A scoring module may be operable to execute on one or more of the hardware processors and further operable to determine an overall score for the answer based on a number of statements determined to be accurate, a number of statements determined to be inaccurate, a number of duplicate statements in the answer relative to a total number of statements in the answer. A visual assessment module may be operable to generate a visual graphics representing accurate and inaccurate statements determined by the cognitive engine and the overall score. A graphical user interface may be operable to display the visual graphics and interact with a user to allow the user to modify the overall score.

A computer-implemented method of assessing a subjective answer, in one aspect, may include receiving first data representative of a domain associated with a question. The method may also include receiving second data representative of an answer to the question, the second data comprising a plurality of statements. The method may also include searching a database of sources to retrieve information associated with the domain. The method may also include determining whether a statement is accurate or inaccurate, for each of the plurality of statements based on matching the statement with the information associated with the domain according to an accuracy threshold. The method may also include determining an overall score for the answer based on a number of statements determined to be accurate, a number of statements determined to be inaccurate, a number of duplicate statements in the answer relative to a total number of statements in the answer. The method may also include generating visual graphics representing accurate and inaccurate statements and the overall score. The method may also include displaying the visual graphics on a display device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A computer-implemented cognitive system and method are disclosed. Given a question and its essay-type answers, the cognitive system and method of the present disclosure in one embodiment can analyze and classify the question to determine a domain of expertise and query its knowledge base to discover facets of the domain of expertise. The cognitive system and method in one embodiment compares the given answer with known facts and rates its accuracy, e.g., confidence. The cognitive system and method in one embodiment may use a comparative approach to determine the accuracy, when facts are unknown or below a confidence threshold. The cognitive system and method in one embodiment may also assign an overall score to the input answer using relative scoring. A graphical user interface (GUI) interface may also be provided for assessing the scoring mechanism.

A system and/or method in one embodiment may automatically evaluate subjective answers in the absence of any reference answers or standards. The system and/or method in one embodiment may automatically score these subjective answers based on the known facts related to the domain by querying a cognitive engine. The system and/or method in one embodiment may automatically score a statement by comparing with similar statements in other answers, if the confidence score of the related facts is below a threshold. The system and/or method in one embodiment may automatically arrive at a final score from the number of accurate, inaccurate and duplicate statements using a reward and/or penalty approach. A visual interface may be provided for post-processing the automatic evaluations.

Figure 1:
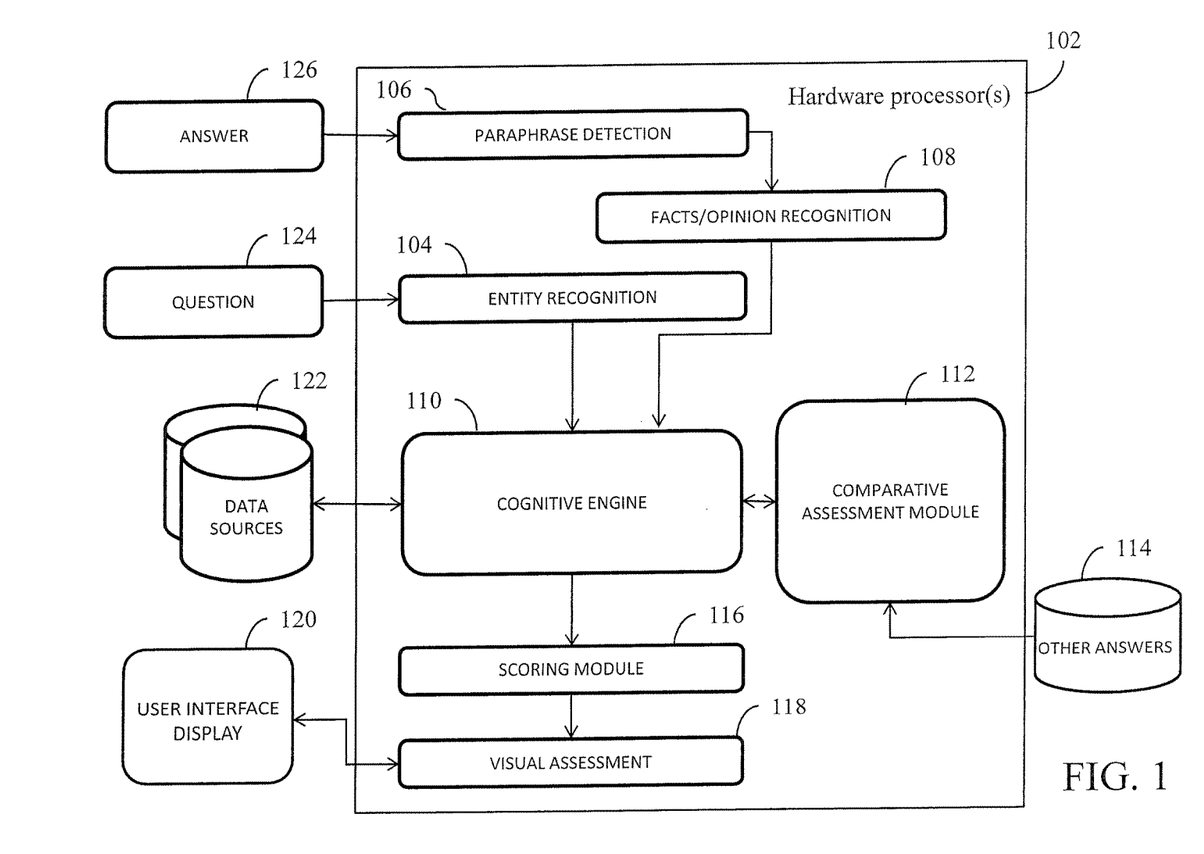
FIG. 1 is a diagram illustrating a cognitive system that assesses subjective answers in one embodiment of the present disclosure.

FIG. 1 is a diagram illustrating a cognitive system that assesses subjective answers in one embodiment of the present disclosure. The system in one embodiment may include the following computer-implemented functions or modules that execute one or more hardware processors (e.g., 102): named entity recognition 104, paraphrase detection 106, facts/opinion recognition 108, comparative assessment module 112, a fact and/or non-fact based scoring functions 116, a cognitive engine 110 and visual assessment module 118. One or more of these functions and modules may implement information extraction, text analytics and/or natural language processing techniques on a computer processor. The components may execute or run on one or more hardware processors, microprocessors, or computer processors 102. The hardware processors may be arranged in a distributed manner, for example, communicating over a computer communications network in running the components shown in FIG. 1. In another aspect, the components may run on a single processor.

A computer-executable entity recognition module 104 may receive a question 124 and perform entity recognition. For example, a question 124 may be retrieved from memory or storage device. As another example, a question 124 may be received directly from a user interface process that presented the question to a user to answer. Entity Recognition detects concepts such as names of people, places, companies, events, locations, etc. The entity recognition module 104 may classify the question and determine one or more domains associated with the question, e.g., the topic or subject matter of the question.

A cognitive engine 110 that executes on one or more hardware processors may receive the classified question and/or the determined one or more domains (e.g., referred to as first data representative of a domain associated with the question), and retrieve facts or information associated with the domain from data sources 122, for example, via a computer communication network. The data sources 122 may include the information available on the Internet, various databases and knowledge-bases. A search engine-like processing coupled with a computer-implemented natural language processing technique may be performed to retrieve information or data associated with the questions or the domain of the question.

A paraphrase detection module 106 receives an answer 126 to the question 124 and parses the answer e.g., by executing a computer-implemented natural language processing technique, into paraphrases. In one embodiment, by only considering unique paraphrases, duplicate statements in the answer can be eliminated from the scoring, or duplicate words and/or phrases in the statement can be highlighted to aid the processing in cognitive engine 110. An answer 126 may be retrieved from memory or storage device. As another example, an answer 126 may be received directly from a user interface via which a user entered or input the answer.

A facts and/or opinion recognition module 108 extracts facts and/or opinions from the paraphrases. One or more natural language processing techniques may be executed to extract facts and/or opinions. For example, techniques that extract facts and/or opinions may use Part-Of-Speech (POS) taggers to annotate syntax such as nouns, verbs, adjectives, prepositions, noun phrases, etc. Using such POS taggers, a statement can be classified as fact or opinion. As an example, words and phrases such as "I think", "I suspect", "That might be", "There could be" and so on increase the possibility of the user opining, whereas phrases such as " . . . is known to be . . . ", " . . . was the year of . . . ", "It started a . . . " and so on, indicate that a fact is being stated. The paraphrase detection module 106 and the facts and/or opinion recognition module 108 may perform their respective processing for each of the multiple answers.

Input to the cognitive engine 110, for example, may comprise a topic (e.g., associated with the question referred to above as first data representative of a domain associated with a question) and a set of statements made in the answer (e.g., an essay), e.g., referred to as second data representative of an answer to the question. The cognitive engine 110 receives the fact and/or opinion statements extracted from the answer and compares those statements associated with the answer with the information associated with the question domain retrieved from the data sources 122. For each extracted statement in the answer, the cognitive engine 110 determines whether the statement is accurate based on an accuracy threshold. For example, based on the comparison of the statement and retrieved information, and determination of how closely they match (e.g., match up to a given threshold), whether the statement is accurate or not, may be determined. For instance, a threshold may be pre-defined and may be configurable. A threshold value, for example, may be 90% matching. The cognitive engine 110 may also assign several factual scores to each statement based on evidences gathered from different data sources 122 and then combine them to determine the final score. For instance, the factual score determines whether each statement is a fact or not. If the statement is an opinion, the more likely it is that the final score of the statement decreases.

Responsive to determining that there is no matching reference information that match the statement, the cognitive engine 110 may invoke a comparative assessment module 112 that finds similar statements made by other individuals and determines the accuracy e.g., by searching a database of other answers 114. For example, if it is determined that the cognitive engine's 110 assessment has below threshold level confidence, the statement may be scored based on statements found in answers (e.g., essays) given by other individuals (e.g., students who answered the same question). For example, if many students have given the same or similar statement then it is highly likely that the statement is a fact. For example, the comparative assessment module 112 may search its database of answers 114 given by other individuals and find matching statements. In another aspect, the comparative assessment module 112 may search the database of answers 114 and provide a plurality of comparative statements in the database of answers to the cognitive engine 110, and the cognitive engine 110 determines the degree of similarly between the statement in the answer and the plurality of comparative statements. Based on this comparative assessment of whether the statement matches with those statements given by other individuals and to what degree, the cognitive engine 110 may assign a factual score to each statement that the comparative assessment module 112 assessed.

In another aspect, the cognitive engine 110 may utilize both the data source information 122 and the comparative data from the comparative assessment module 112 to determine whether a statement is accurate or inaccurate, and/or to assign an accuracy score to the statement.

In one aspect, the information retrieved from data sources 122 may have associated confidence scores. For instance, a data source may be classified as highly reliable and/or trustworthy. In such a scenario, the cognitive engine 110 may assign a confidence of 1.0 (i.e. 100%) to all the facts extracted from that data source. The cognitive engine 110 can assign this confidence at the time of ingesting such a data source. Similarly, based on the degree of reliability of data sources, information from such data sources may be assigned different confidence levels. The cognitive engine 110 may also invoke the comparative assessment module 112, e.g., if the matching information has associated confidence score that is below a defined threshold value.

Based on the cognitive engine's and/or comparative assessment module's accuracy determination of the statements in the answer, a scoring module 116 determines the number of accurate statements, the number of inaccurate statements, and the number of duplicate statements made relative to the overall number of statements. The scoring module 116 determines an overall score for the answer, for example, based on the number of accurate statements, the number of inaccurate statements, and the number of duplicate statements made relative to the overall number of statements. The scoring module 116, for example, scores each answer (e.g., essay) based on scores assigned to each statement in the answer. The scoring module 116 may determine the overall score with penalties for inaccurate and duplicate facts and rewards for accurate statements (hits).

A visual assessment module 118 generates a visual assessment of the statements in the answer, for example, Red Amber Green (RAG) assessment of the statements, and presents or displays the assessment visually on a display device 120, for example, via graphical user interface. The visual assessment module 118 via the graphical user interface may allow a user to correct and/or override the scores assigned by the cognitive engine 110. The modified score, for example, may be used to improve the cognitive engine 110, for example, to allow the cognitive engine 110 to learn, for example, by machine learning.

Figure 2:
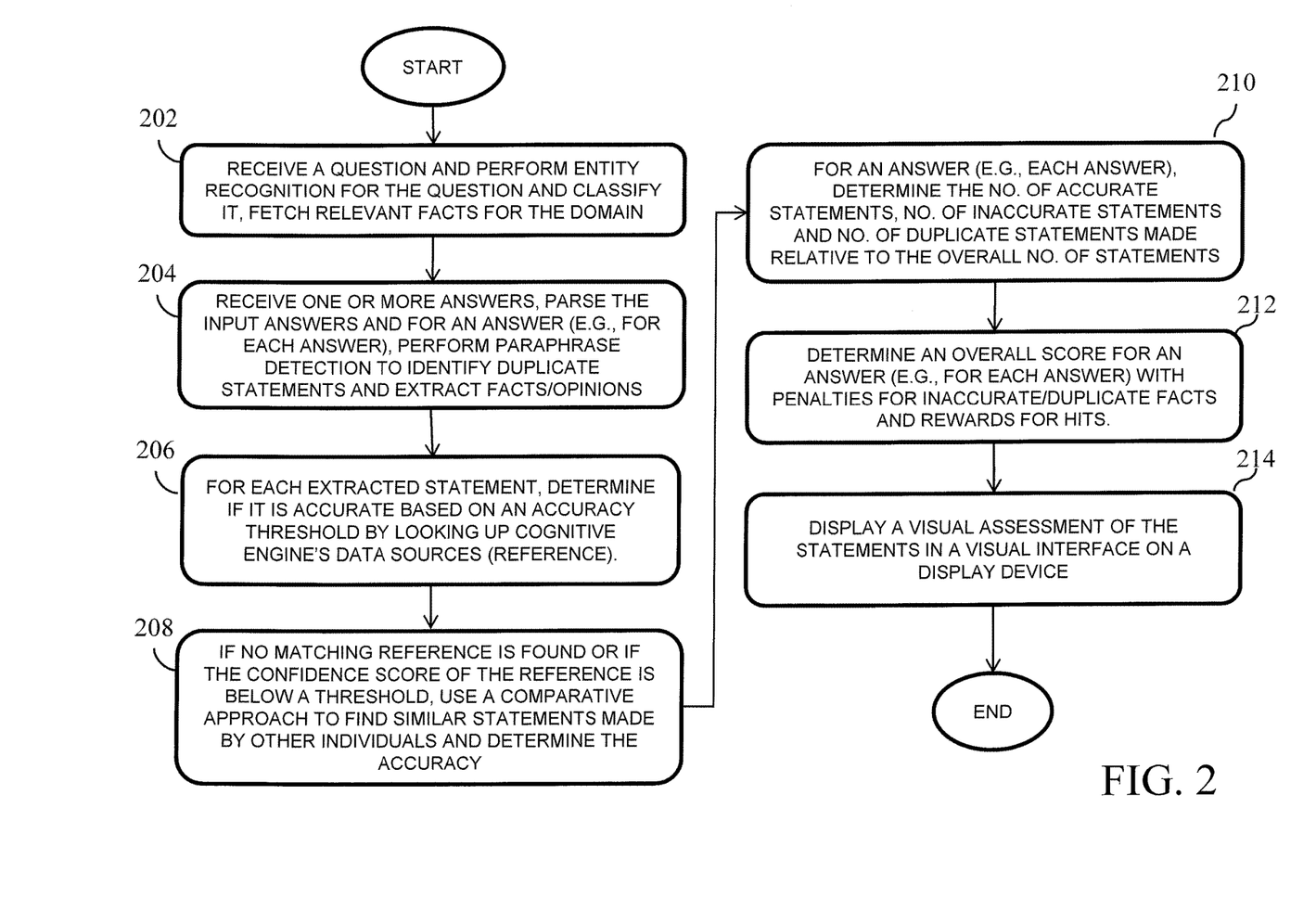
FIG. 2 is a flow diagram illustrating a computer-implemented method that automatically assesses subjective answers in one embodiment of the present disclosure.

FIG. 2 is a flow diagram illustrating a computer-implemented method that automatically assesses subjective answers in one embodiment of the present disclosure. One or more hardware processors, microprocessors, or computer processors may execute or implement the method shown in FIG. 2. A question may be received and at 202, entity recognition for the question is performed. The question is classified and relevant facts are fetched for the domain. Entity Recognition detects concepts such as names of people, places, companies, events, locations, and/or others. Based on such extracted concepts, relevant domain facts obtained by the cognitive engine, after ingestion and processing of data sources, can then be fetched and loaded.

An answer to the question may be received and at 204, the answer is parsed. Paraphrase detection is performed on the answer that is parsed, duplicate statements are identified and facts and/or opinions in the answer are extracted. One or more natural language processing techniques may be executed to identify duplicate statements and extract facts and/or opinions. These techniques may use Part-Of-Speech (POS) taggers to annotate syntax such as nouns, verbs, adjectives, prepositions, noun phrases, etc., using which a statement can be classified as fact or opinion. As an example, words and phrases such as "I think", "I suspect", "That might be", "There could be" and so on increase the possibility of the user opining, whereas phrases such as " . . . is known to be . . . ", " . . . was the year of . . . ", "It started a . . . " and so on, indicate that a fact is being stated. Multiple answers may be received and the processing shown in FIG. 2 may be performed for each of the multiple answers.

At 206, for an extracted statement (fact or opinion) extracted at 204, its accuracy (accuracy score) is determined based on an accuracy threshold, e.g., by looking up or searching cognitive engine's data sources, for example, as references as well as the inherent confidence, e.g., a fact scores high on confidence than an opinion that the user expresses. The processing at 206 in one embodiment is performed for all extracted statements.

At 208, if no matching reference is found or if the confidence score of the reference is below the accuracy threshold, a comparative approach is performed to find similar statements made by other individuals and the accuracy of the statement is determined based on the comparative approach.

At 210, for an answer, the number of accurate statements determined to be accurate according to a threshold, the number of inaccurate statements determined to be not accurate according to the threshold, and the number of duplicate statements made relative to the overall number of statements, are determined.

At 212, an overall score for an answer is determined based on the attributes determined at 210. The overall score may be determined with penalties for inaccurate and duplicate facts and rewards for accurate statements (hits).

At 214, a visual assessment of the statements in an answer may be presented or displayed on a display device, for example, as a visual or graphical user interface. An example of such visual assessment may include Red Amber Green (RAG) assessment of the statements in a visual interface.

The following illustrates an example question, answer and an assessment of the answer in one embodiment of the present disclosure. Consider an example question: "Describe the Great Depression." An example answer given may be as follows: The Great Depression started in US around 1930. It caused lot of jobs to be lost, increase in poverty and unemployment, and even led to stock market crash. It affected several economies worldwide and ended with World War 2". The answer is parsed into paraphrases and duplicate statements, if any, may be identified. Fact and/or opinion statements are extracted from the answer.

Column 1 of Table 1 below illustrates example statements extracted from the answer. These statements are input to the cognitive engine in one embodiment.

Column 2 of Table 1 below illustrates confidence level associated with the extracted statements. A fact scores high on confidence than an opinion that the user expresses. For example, the last two rows have an input confidence score of 1.0 as they are classified as 'facts' by the facts and/or opinion recognition module 108. The first row is classified as 'opinion' due to the presence of words/phrases such as "around". This leads the cognitive engine 110 to decrease the input confidence of the statement, which in turn affects the final statement score. The second statement is identified as containing duplicate words/phrases—"lot of jobs to be lost" and "unemployment"—by the paraphrase detection module 106. This leads the cognitive engine 110 to decrease the input confidence of the statement, which in turn affects the final score of the statement.

Column 3 of Table 1 below illustrates example information retrieved from example sources based on a determined domain of the question. For instance, the question may be classified and its domain determined as "history" and "history of US" and "Great Depression." Data sources may be searched to find information associated with that domain, for example, using search engine-like techniques coupled with natural language processing techniques. Examples of data sources may include database sources available on the World Wide Web (Web), for example, crowd sourced encyclopedia database (e.g., Wikipedia) or the like, a database of historical information (e.g., history.com) or the like, and/or other available and/or accessible data sources. Sources may also include comparative statements from other individuals (e.g., shown in the last row of Table 1).

Column 4 of Table 1 below illustrates confidence value associated with the source information. Column 5 of Table 1 below illustrates statement score determined, for example, by comparing the answer statement with database sources and/or comparative answers by other individuals, and taking into consideration the input confidence score (e.g., intermediate score), for example, as described above.

| Input | Input Conf. | Source | Source Conf. | Statement Score |
|---|---|---|---|---|
| The Great Depression started in US around 1930. | 0.7 | On-line encyclopedia: The depression originated in the U.S., after the fall in stock prices that began around Sep. 4, 1929. | 1.0 | 0.8 |
| It caused lot of jobs to be lost, increase in poverty and unemployment, and even led to stock market crash. | 0.9 | On-line history information web site: As consumer confidence vanished in the wake of the stock market crash, the downturn in spending and investment led factories and other businesses to slow down production and construction and begin firing their workers. For those who were lucky enough to remain employed, wages fell and buying power decreased. Many Americans forced to buy on credit fell into debt, and the number of foreclosures and repossessions climbed steadily. | 1.0 | 0.9 |
| It affected several economies worldwide. | 1.0 | On-line history information web site: The adherence to the gold standard, which joined countries around the world in a fixed currency exchange, helped spread the Depression from the United States throughout the world, especially in Europe. | 1.0 | 1.0 |
| It ended with World War 2. | 1.0 | Comparative: [. . . ] economy turned around with advent of second World war [. . . ] [. . . ] Until Hitler rose to power and Pearl Harbor attack in 1941, [. . . ] | 0.9 1.0 1.0 | |

Figure 3:
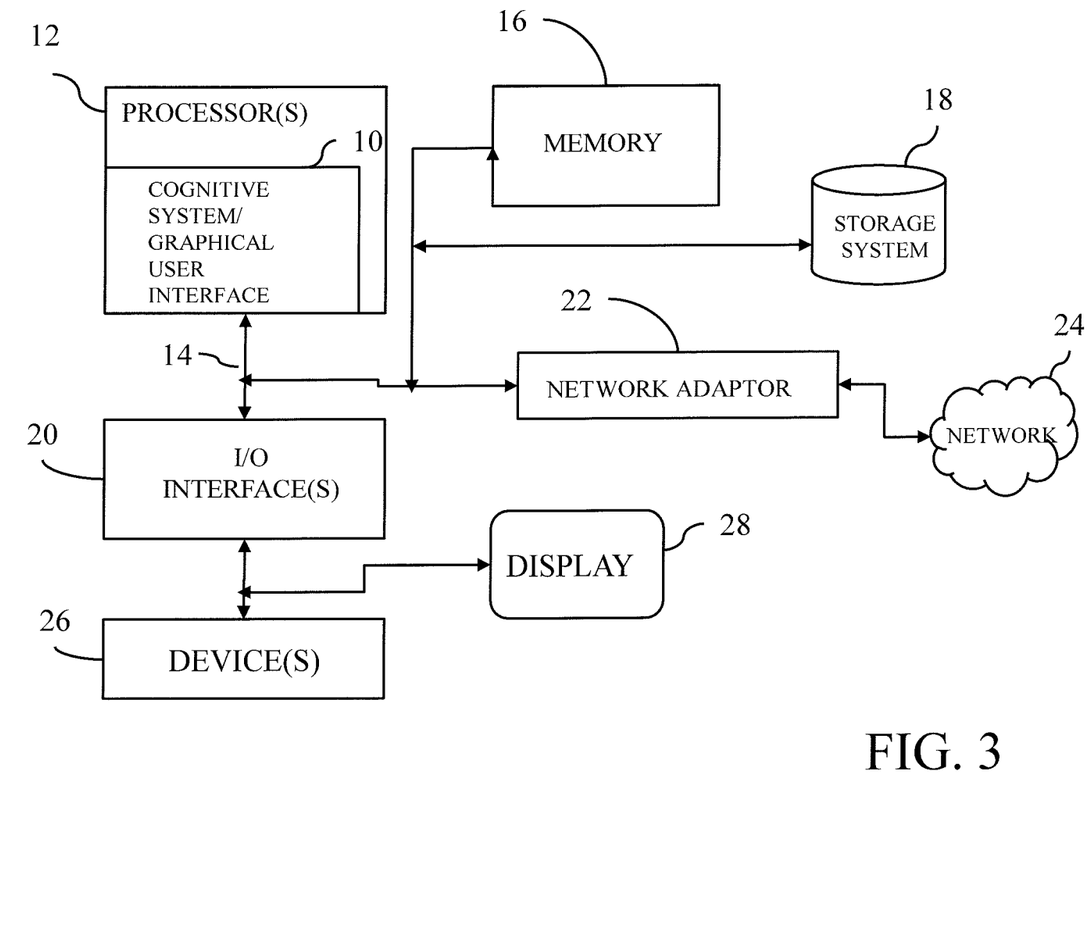
FIG. 3 illustrates a schematic of an example computer or processing system that may implement a cognitive system in one embodiment of the present disclosure.

FIG. 3 illustrates a schematic of an example computer or processing system that may implement a cognitive system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include cognitive system modules 10 that performs the methods described herein. The modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented cognitive system, comprising:
   one or more hardware processors;
   a cognitive engine operable to execute on one or more of the hardware processors and further operable to receive first data representative of a domain associated with a question,
   the cognitive engine further operable to search a database of sources and retrieve information associated with the domain,
   the cognitive engine further operable to receive second data representative of an answer in an essay form to the question, the second data comprising a plurality of statements that make up the answer in the essay form,
   the cognitive engine further operable to determine whether a statement is accurate or inaccurate, for each of the plurality of statements based on matching the statement with the information associated with the domain according to an accuracy threshold;
   a scoring module operable to execute on one or more of the hardware processors and further operable to determine an overall score for the answer based on a number of statements in the answer in the essay form determined to be accurate, a number of statements in the answer in the essay form determined to be inaccurate, a number of duplicate statements in the answer in the essay form relative to a total number of statements in the answer in the essay form; and
   a visual assessment module operable to generate a visual graphics representing accurate and inaccurate statements determined by the cognitive engine and the overall score;
   a graphical user interface operable to display the visual graphics and interact with a user to allow the user to modify the overall score; and
   a comparative assessment module operable to execute on one or more of the hardware processors and further operable to search a database of answers to the question to identify a plurality of comparative statements comprising answers provided by a plurality of individuals in answering the question, the comparative assessment module further operable to provide the plurality of comparative statements to the cognitive engine, wherein the cognitive engine matches the statement with the plurality of comparative statements to determine whether the statement is accurate or inaccurate, the comparative statements comprising an essay-type of answers given by the plurality of individuals.

2. The system of claim 1, wherein the cognitive engine invokes the comparative assessment module for determining whether the statement is accurate or inaccurate, responsive to determining that the statement does not match the information associated with the domain.

3. The system of claim 1, wherein a computer-implemented natural language technique classifies the question and determines the domain.

4. The system of claim 1, wherein a computer-implemented natural language technique parses the answer, extracts the plurality of statements and identifies duplicate statements in the answer, and annotates each of the plurality of statements as fact or opinion.

5. The system of claim 1, wherein the cognitive engine invokes the comparative assessment module for determining whether the statement is accurate or inaccurate, responsive to determining that the statement matches with a confidence that is below the accuracy threshold.

6. A computer-implemented method of assessing a subjective answer, the method performed by one or more hardware processors, comprising:
   receiving first data representative of a domain associated with a question;
   receiving second data representative of an answer in an essay form to the question, the second data comprising a plurality of statements that make up the answer in the essay form;
   searching a database of sources to retrieve information associated with the domain;
   determining whether a statement is accurate or inaccurate, for each of the plurality of statements based on matching the statement with the information associated with the domain according to an accuracy threshold;
   determining an overall score for the answer based on a number of statements in the answer in the essay form determined to be accurate, a number of statements in the answer in the essay form determined to be inaccurate, a number of duplicate statements in the answer in the essay form relative to a total number of statements in the answer;
   generating visual graphics representing accurate and inaccurate statements and the overall score;
   displaying the visual graphics on a display device;

searching a database of answers to the question to identify a plurality of comparative statements comprising answers provided by a plurality of individuals in answering the question;

matching the statement with the plurality of comparative statements to determine whether the statement is accurate or inaccurate, the comparative statements identified from an essay-type of answers given by the plurality of individuals responsive to the question.

7. The method of claim 6, further comprising:

interacting with a user by a computer-implemented user interface to allow the user to modify the overall score.

8. The method of claim 7, further comprising:

learning by one or more of the hardware processors, to determine whether one or more of the plurality of statements is accurate or inaccurate further based on the overall score responsive to the user modifying the overall score.

9. The method of claim 6, wherein the searching of the database of answers to the question and the matching the statement with the plurality of comparative statements, are performed responsive to determining that the statement does not match the information associated with the domain.

10. The method of claim 6, further comprising performing a computer-implemented natural language technique that classifies the question and determines the domain.

11. The method of claim 6, further comprising performing a computer-implemented natural language technique that parses the answer, extracts the plurality of statements and identifies duplicate statements in the answer, and annotates each of the plurality of statements as fact or opinion.

12. The method of claim 6, wherein the searching of the database of answers to the question and the matching the statement with the plurality of comparative statements, are performed responsive to determining that the statement matches with a confidence that is below the accuracy threshold.

13. A non-transitory computer readable storage medium storing a program of instructions executable by a machine to perform a method of assessing a subjective answer, the method comprising:

receiving first data representative of a domain associated with a question;

receiving second data representative of an answer in an essay form to the question, the second data comprising a plurality of statements that make up the answer in the essay form;

searching a database of sources to retrieve information associated with the domain;

determining whether a statement is accurate or inaccurate, for each of the plurality of statements based on matching the statement with the information associated with the domain according to an accuracy threshold;

determining an overall score for the answer based on a number of statements in the answer in the essay form determined to be accurate, a number of statements in the answer in the essay form determined to be inaccurate, a number of duplicate statements in the answer in the essay form relative to a total number of statements in the answer;

generating visual graphics representing accurate and inaccurate statements and the overall score;

displaying the visual graphics on a display device;

searching a database of answers to the question to identify a plurality of comparative statements comprising answers provided by a plurality of individuals in answering the question;

matching the statement with the plurality of comparative statements to determine whether the statement is accurate or inaccurate, the comparative statements identified from an essay-type of answers given by the plurality of individuals responsive to the question.

14. The non-transitory computer readable storage medium of claim 13, further comprising:

interacting with a user by a computer-implemented user interface to allow the user to modify the overall score.

15. The non-transitory computer readable storage medium of claim 14, further comprising:

learning by one or more of the hardware processors, to determine whether one or more of the plurality of statements is accurate or inaccurate further based on the overall score that responsive to the user modifying the overall score.

16. The non-transitory computer readable storage medium of claim 13, wherein the searching of the database of answers to the question and the matching the statement with the plurality of comparative statements, are performed responsive to determining that the statement does not match the information associated with the domain.

17. The non-transitory computer readable storage medium of claim 13, further comprising performing a computer-implemented natural language technique that classifies the question and determines the domain.

18. The non-transitory computer readable storage medium of claim 13, further comprising performing a computer-implemented natural language technique that parses the answer, extracts the plurality of statements and identifies duplicate statements in the answer, and annotates each of the plurality of statements as fact or opinion.

19. The non-transitory computer readable storage medium of claim 13, wherein the searching of the database of answers to the question and the matching the statement with the plurality of comparative statements, are performed responsive to determining that the statement matches with a confidence that is below the accuracy threshold.

* * * * *